United States Patent
Marty et al.

(10) Patent No.: US 10,541,927 B2
(45) Date of Patent: Jan. 21, 2020

(54) SYSTEM AND METHOD FOR HARDWARE-INDEPENDENT RDMA

(71) Applicant: Google LLC, Mountain View, CA (US)

(72) Inventors: Michael Marty, Madison, WI (US); Joel Scherpelz, Madison, WI (US); Marc de Kruijf, Madison, WI (US); Christopher Alfeld, Madison, WI (US)

(73) Assignee: Google LLC, Mountain View, CA (US)

( * ) Notice: Subject to any disclaimer, the term of this patent is extended or adjusted under 35 U.S.C. 154(b) by 140 days.

(21) Appl. No.: 15/393,529

(22) Filed: Dec. 29, 2016

(65) Prior Publication Data

US 2018/0191623 A1 Jul. 5, 2018

(51) Int. Cl.
*H04L 12/859* (2013.01)
*H04L 12/26* (2006.01)
(Continued)

(52) U.S. Cl.
CPC ...... *H04L 47/2475* (2013.01); *H04L 41/0672* (2013.01); *H04L 43/0835* (2013.01); *H04L 47/6255* (2013.01)

(58) Field of Classification Search
CPC ............. H04L 47/2475; H04L 41/0672; H04L 43/0835; H04L 47/6255; G06F 9/544; G06F 15/167
See application file for complete search history.

(56) References Cited

U.S. PATENT DOCUMENTS

| | | |
|---|---|---|
| 5,063,500 A | 11/1991 | Shorter |
| 5,878,241 A | 3/1999 | Wilkinson et al. |

(Continued)

FOREIGN PATENT DOCUMENTS

WO 2007002710 A1 1/2007

OTHER PUBLICATIONS

Rev www.Mellanox.com: "RDMA Aware Networks Programming User Manual", Dec. 22, 2016 (Dec. 22, 2016), pp. 1-216, XP055434545, Retrieved from the Internet: URL: https://web.archive.org/web/20161222091850if_/http://www.mellanox.com/related-docs/prod_software/RDMA_Aware_Programming_user manual.pdf.

(Continued)

*Primary Examiner* — Habte Mered
(74) *Attorney, Agent, or Firm* — Lerner, David, Littenberg, Krumholz & Mentlik, LLP

(57) ABSTRACT

A computing system dedicates one or more processing units, such as cores, for the purposes of packet processing software, wherein other processing units simultaneously run application software. In some examples, the system uses dynamic load information to dynamically increase and decrease the number of processing units dedicated to packet processing. The system may further include a mechanism for establishing shared-memory regions for interacting with other applications' users. The shared memory mechanisms provide an abstraction of per-application "command" and "completion queues". The system may poll per-application command queues for detecting the arrival of new requests. The mechanism also provides detection of application termination, as well as an ability for an application to expose portions of its address space for the reception and transmission of data. In some examples, the system further includes a framework for executing software-defined handlers inline with threads that run packet processing and transport software.

20 Claims, 8 Drawing Sheets

(51) Int. Cl.
   *H04L 12/863*   (2013.01)
   *H04L 12/24*    (2006.01)

(56) References Cited

U.S. PATENT DOCUMENTS

| | | | |
|---|---|---|---|
| 6,904,519 B2 | 6/2005 | Anand et al. | |
| 9,477,525 B2 * | 10/2016 | Munshi | G06F 9/4843 |
| 2011/0270976 A1 * | 11/2011 | Yasuda | H04L 47/10 709/224 |
| 2013/0086311 A1 * | 4/2013 | Huang | G06F 13/1689 711/103 |
| 2014/0019982 A1 * | 1/2014 | John | G06F 9/544 718/102 |
| 2016/0044081 A1 * | 2/2016 | Pingenot | H04L 65/4069 709/219 |
| 2016/0085577 A1 * | 3/2016 | Gray | G06F 9/45558 718/1 |
| 2016/0188527 A1 | 6/2016 | Cherian et al. | |
| 2016/0321072 A1 * | 11/2016 | Cannata | G06F 9/3009 |

OTHER PUBLICATIONS

International Search Report and Written Opinion for International Application No. PCT/US2017/053443 dated Dec. 21, 2017. 15 pages.

Veldema et al., Evaluation of RDMA opportunities in an Object-Oriented DSM, Languages and Compilers for Parallel Computing, vol. 5234 of the series Lecture Notes in Computer Science, copyright 2008, pp. 217-231.

Von Eicken et al., Active Messages: a Mechanism for Integrated Communication and Computation, 1992 Article, 11 pages. Retrieved from Internet <http://dl.acm.org/citation.cfm?id=140382>.

Toal et al., Distributed and Concurrent Test Environments on Popular Cots Platforms, 2000, IEEE, 9 pages.

Santos et al., Bridging the GAP between Software and Hardware Techniques for I/O Virtualization, [Retrieved Nov. 29, 2016] Retrievied from the internet: <https://www.usenix.org/legacy/event/usenix08/techlfull_papers/santos/santos_html/>, 24 pages.

"DPDK Data Plane Development Kit", [online]. [Retrieved from internet Nov. 30, 2016] Retrieved from internet: <http://dpdk.org/>, 2 pages.

Liss et al., Efficient Exploitation of Kernel Acces to Infiniband: a Software DSM Example, 2003, IEEE, 6 pages.

Thiele et al., Embedded Software in Network Processors—Models and Algorithms, http:// ww.tik.ee.ethz.ch, 2001, 19 pages.

Trahay et al, A multithreaded communication engine for multicore architectures. Communication Architecture for Clusters, Apr. 2008, Miami, United States. 2008, <10.1109/IPDPS.2008.4536139>. <inria-00224999>.

Lentini et al., Implementation and Analysis of the User Direct Access Programming Library, 2003, 12 pages.

Brunner, Sandro, InfiBand: An Introduction + Simple IB verbs program with RDMA Write, A Blog of the ZHAW Zurich University of Applied Sciences, posted Nov. 22, 2013, 9 pages. Retrieved from internet: <https://blog.zhaw.chlicclab/infiniband-an-introduction-simple-ib-verbs-program-with-rdma-write/>.

Lim et al., MICA: A Holistic Approach to Fast In-Memory Key-Value Storage, 11th USENIX Symposium on Networked Systems Design and Implementation, Apr. 2-4, 2014,16 pages.

Dobrescu et al., RouteBricks: Exploiting Parallelism to Scale Software Routers, 2009. 17 pages.

Shalev et al., Iso Stack—Highly Efficient Network Processing on Dedicated Cores, IBM Research Lab—Haifa, May 28, 2010, 14 pages.

Jeong et al.,mTCP A Highly Scalable User-level TCP Stack for Multicore Systems. Retrieved from Internet http://shader.kaist.edu/mtcp/, Jun. 7, 2017, 4 pages.

Jeong et al, mTCP: A Highly Scalable User-level TCP Stack for Multicore Systems, NSDI, 2014, 14 pages.

International Preliminary Report on Patentability for International Application No. PCT/US2017/053443 dated Jul. 11, 2019. 8 pages.

* cited by examiner

SYSTEM AND METHOD FOR HARDWARE-INDEPENDENT RDMA

BACKGROUND

Some high-performance computer systems employ network interface controllers (NIC) that enable low-latency, CPU-efficient communication between machines. Remote Direct Memory Access (RDMA) technology, in particular, is one technique wherein a NIC hardware device implements sufficient functionality to enable one machine to efficiently access the memory of another machine without incurring the overhead of general-purpose software networking stacks that run on time-shared host processors. NICs with this functionality are sometimes referred to as "Smart NICs" because they implement significantly more functionality than a generic NIC that simply sends and receives host-generated packets. The functions of a Smart NIC include a reliable transport in the NIC as well as a suite of "Verbs" that implements specific functions such as RDMA Read and Write.

General-purpose host networking stacks, running on conventional NICs, are unable to provide the same low latency guarantees as dedicated hardware-based Smart NICs. First, kernel-based networking stacks are primarily designed to time-share cores with other applications and services. Time-sharing a processor will inevitably result in latency impact due to interrupt handling and context switching with unpredictable scheduler delays. Second, time-shared networking stacks must be invoked through the use of an operating system call which has non-trivial overhead. Third, conventional host networking stacks do not implement Verbs in order to execute well-defined functions, such as RDMA Read and Write, inline with the transport. Instead they must dispatch an incoming request to an application thread, and the act of dispatching an application thread incurs significant CPU overhead and latency.

Hardware-based Smart NICs have several problems. First they are inflexible to change. It is either difficult or impossible to extend the NIC with new Verbs, new congestion control algorithms, or with bug fixes. Second, hardware-based Smart NICs often have other requirements on the surrounding systems such as requiring a lossless network fabric.

SUMMARY

The present disclosure provides a computing system that dedicates one or more processing units for the purposes of packet processing software, wherein other processing units simultaneously run application software. In some examples, the system uses dynamic load information to dynamically increase and decrease the number of processing units dedicated to packet processing. The system may use signals such as queue length, queuing latency, and fraction of busy processing loops to detect overload conditions. The system may further include a mechanism for establishing shared-memory regions for interacting with other applications. The shared memory mechanisms provide an abstraction of per-application "command" and "completion queues". The system may poll per-application command queues for detecting the arrival of new requests. The mechanism also provides detection of application termination, as well as an ability for an application to expose portions of its address space for the reception and transmission of data. In some examples, the system further includes a framework for executing software-defined handlers, such as "Verbs," inline with threads that run packet processing and transport software. The handlers may implement RDMA capabilities. The system may further implement packet capture, packet processing, software-defined handler processing, and reliable transport operation all within the same thread.

One aspect of the disclosure provides a system, including a memory storing packet processing instructions, and one or more dedicated packet processing units in communication with the memory and with one or more application processing units. The one or more dedicated packet processing units are dedicated to performing packet processing, and each of the one or more dedicated packet processing units has an assigned processing thread. The one or more dedicated packet processing units are configured to receive, in a first processing thread, a packet from an application run on one or the application processing units, and process, in the first processing thread, software-defined handler operations initiated by commands in the received packet without dispatching the operation to an application thread. In some examples, the one or more processors are further configured to run transport for the received packets, and run transport for processed packets to be transmitted, wherein running the transports are performed in the first processing thread. The transport may interface with the one or more application processing units without context switching or system calls. The one or more processors may be further configured to poll one or more command queues, each command queue being specific to an application, wherein the received packet is pulled from the one or more command queues, and enter completions into a completion queue. The command and completion queues may be included in a shared memory, the shared memory being shared between the one or more processing units and a second processing unit specific to the application. The one or more dedicated packet processing units may be processing cores of a multi-core processor. In some examples, such a multi-core processor resides in a network interface controller (NIC) interfaced with an engine including a memory storing the assigned threads.

Another aspect of the disclosure provides a system, including one or more memories, a first set of processing units in communication with the one or more memories, the first set of processing units configured to exclusively perform packet processing, and a second set of processing units in communication with the one or more memories and the first set of processing units, the second set of processing units configured to exclusively run applications. Each of the first processing units is assigned a processing thread, the processing thread executable by one of the first processing units to process received packets, run transport for the received packets, process software-defined handler operations, and run transport for packets to be transmitted. The system may further include a shared memory, such as shared memory rings, between the first set of processing units and the second set of processing units. In some examples, each of the second set of processing units communicates over a separate set of shared memory rings, the set comprising transmit rings and receive rings. Further, the shared memory may include at least one command queue and at least one completion queue. The first set of processing units may be configured to poll command queues for each application, and enter completions in the completion queues after completing packet processing operations.

Yet another aspect of the disclosure provides a method, including receiving, with a first processor dedicated to performing packet processing and executing a first processing thread, a packet from an application run on a second processor dedicated to application processing, and processing, in the first processing thread, software-defined handler operations initiated by commands in the received packet, without invoking additional threads. The method may further include running transport, with the first processor executing the first processing thread, for the received packets, and running transport, with the first processor executing the first processing thread, for processed packets to be transmitted.

DETAILED DESCRIPTION

Overview

Figure 1:
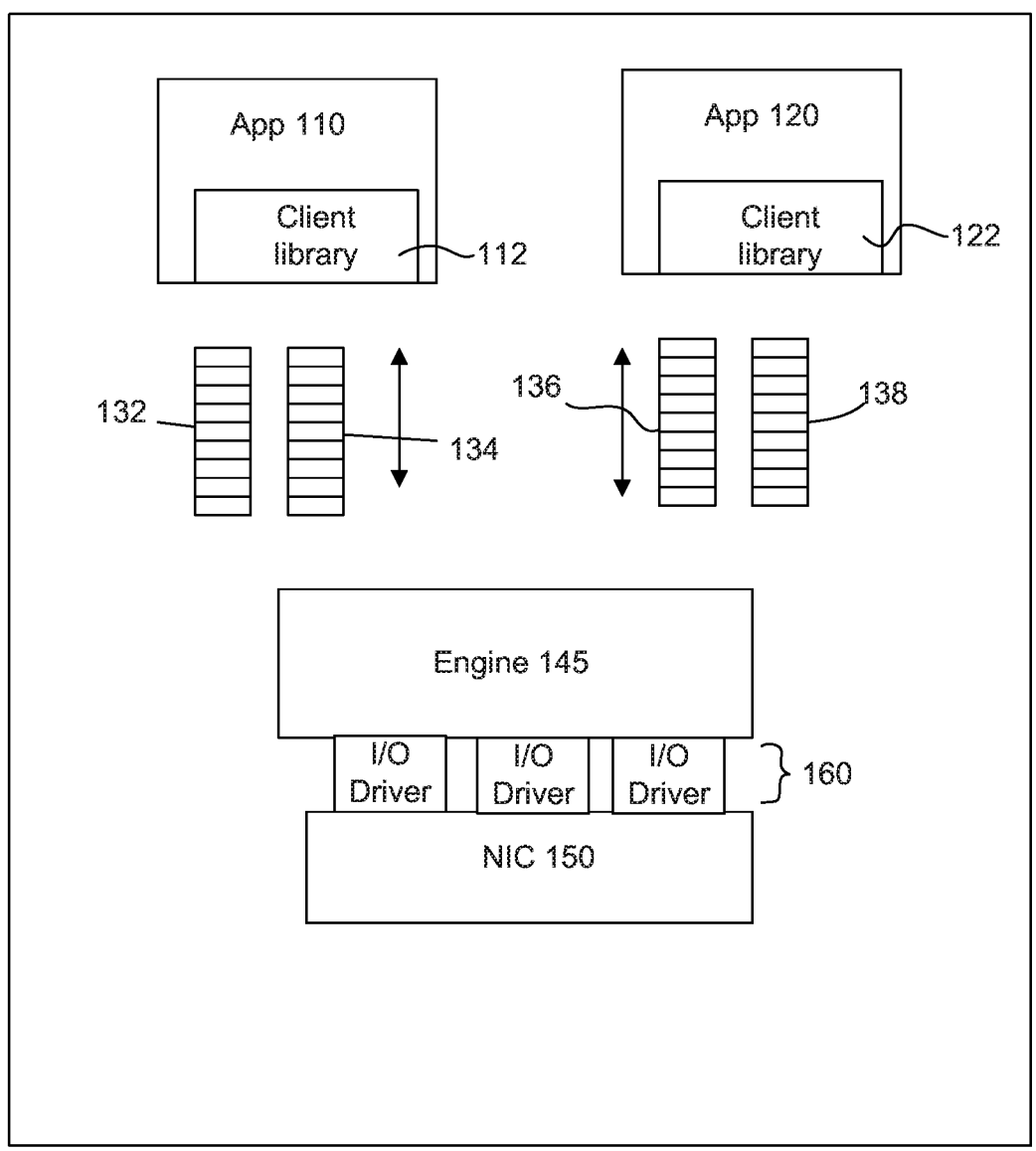
FIG. 1 is a block diagram of an example system according to aspects of the disclosure.

The disclosure is directed to a system including a plurality of processors, such as processing cores, where one or more first processors of the plurality are dedicated to packet processing software, and one or more second processors of the plurality are dedicated to running application software. The one or more first processors, dedicated to packet processing, may be general purpose cores. One or more software threads are assigned to a matching number of dedicated processors. Each processing thread carries out the following actions in a busy-processing loop, though not necessarily in the order specified: process incoming packets, run reliable transport for received packets, process software-defined handler operations (e.g., Verb operations), run reliable transport for transmission packets, poll command queues for each application. Thus, for example, one thread polls receive (Rx) queues for incoming packets, and runs reliable transport for the incoming packets from the Rx queue, such as by watching for network trouble (e.g., signals of congestion, drops, delay, etc.), modifying transport parameters in response, and noting any packets lost in transmission. In some examples, the thread running reliable transport for incoming packets from the Rx queue could trigger retransmission of lost packets, such as through receipt of a NAK or duplicate ACK. Running the reliable transport generates acknowledgments and schedules processing of Verb operations. For example, for each Verb operation, a particular state machine may be selected to process that Verb operation. Performing the Verb operations may include scheduling transmit (Tx) packets. Reliable transport is also run for the Tx packets, such as by generating acknowledgements and retransmitting lost packets. The thread polls one or more shared-memory command queues for each application that communicates with the NIC, for example, for additional commands to process. While performing any of these actions, the thread may also write completions to notify applications of completed work. For example, the state machine may write metadata to shared memory links, which are shared between the dedicated processor and the one or more second processors.

By running on dedicated processing cores, a core is always available to immediately process incoming packets. Packets may be sent to and received from the hardware NIC without system call overhead and without interrupts. The software threads may run in privileged or unprivileged mode.

Command and completion queues are used for interacting between the NIC and applications, and may be lock-free. An application desiring use of the NIC establishes communication with the NIC over an initial channel by establishing an intra-machine connection using an existing communication primitive, such as a Unix domain socket or similar. Once this initial channel has been established, the application uses operating system mechanisms to establish a shared memory region with the NIC.

A framework is implemented for executing Verbs inline with a transport processing thread. The framework is designed with extensibility such that application developers can create new Verbs without significant rework. The wire format contains an "operation code" for specifying the Verb operation to perform.

Example Systems

FIG. 1 illustrates a system 100, including application processors 110, 120 in communication with a NIC 150 through shared memory 132, 134. The system 100 may be implemented as a system of devices on a motherboard, or any other configuration of electronically coupled computing devices. For example, the system may include a backplane interconnecting peripherals, an expansion card interface, or the like. The connection between the computing devices may be hard-wired connections, wireless connections, or any other type of connections. As yet another example, the computer system 100 may include TCP/IP, 802.33, Ethernet, InfiniBand, or any other type of network.

Each application processor 110, 120 may be dedicated to running application software. Each application processor 110, 120 may run one or more applications, and the applications run on one processor may be different than the applications run on other processors. By way of example only, processor 110 may run a remote procedure call (RPC) application, while processor 120 runs a video streaming application. While only two processors 110, 120 are shown, it should be understood that any number of processors may be included, and may run any number of different applications.

Each application may have an associated client library 112, 122. The client libraries 112, 122 may include code, for example, for the applications to interact with application program interfaces (APIs). The APIs may be, for example, in-memory storage systems using RDMA, RPC, or any other type of API.

The shared memory 132, 134 may be, for example, shared memory rings, or any other type of memory. The shared memory 132, 134 may provide memory-based command and completion queues. The shared memory is described in further detail in connection with FIG. 3 below. In some examples, the shared memory 132, 134 is backed by temporary file storage. Moreover, the shared memory 132, 134 may exclude application data payloads. Instead, application data may be communicated to the NIC 150 through memory registration, interprocess shared memory, anonymous-backed heap memory, etc.

Engine 145 may be a packet processing pipeline for a particular function that is pinned to a reserved core. For example, the engine 145 may be implemented in a framework supporting high performance packet processing entities. The engine 145 is described in further detail below in connection with FIG. 2.

The engine 145 interfaces with one or more input/output (I/O) drivers 160, which provide facilities for interacting with hardware components, communicating between threads, and/or communicating with other user-space processes. The I/O drivers 160 may all implement a same unified API. While several I/O drivers 160 are shown, any number of I/O drivers may be included. In some examples, the number of I/O drivers 160 may correspond to a number of cores in the NIC 150.

The engine 145 includes one or more processing cores, each having an assigned thread. The one or more processing cores may be dedicated to packet processing. Using dedicated cores provides several performance benefits. For example, dedicated cores save significant overhead that is necessitated by time-sharing a core. Dedicated cores also provide higher micro-architectural performance, because caches, translation lookaside buffers (TLBs), and branch predictors stay warmer. Even further, dedicated cores avoid significant synchronization overhead associated with shared data structures and work distribution.

Figure 2:
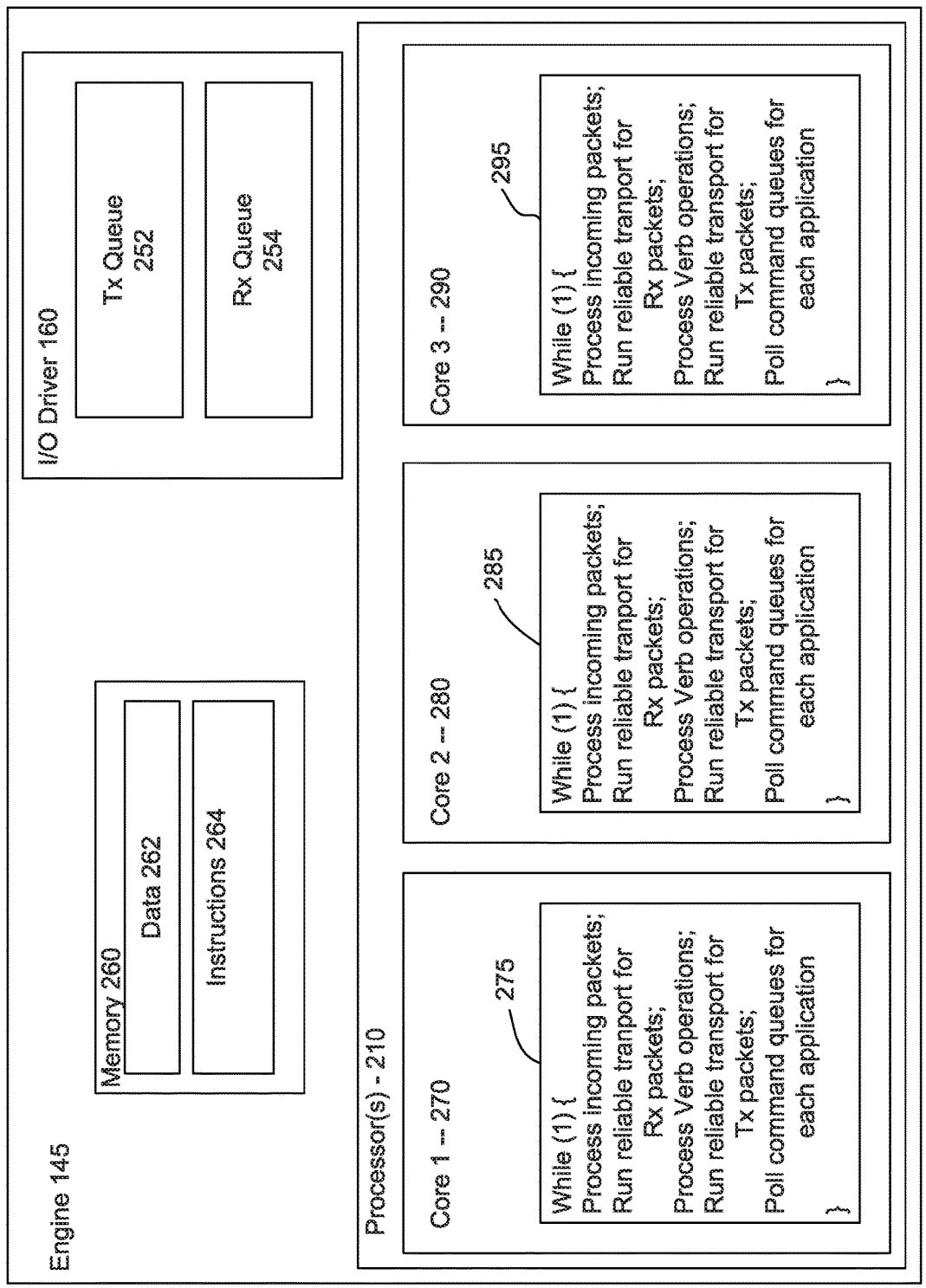
FIG. 2 is a block diagram of an example engine of the system of FIG. 1.

FIG. 2 illustrates the engine 145 in further detail. As shown, the engine 145 includes transmit (Tx) queue 252, receive (Rx) queue 254, and a plurality of processing cores 270, 280, 290. The Tx queue 252 and Rx queue 254 may be used for sending packets to and receiving packets from a network via the NIC. For example, the Tx queue 252 and Rx queue 254 may be part of the I/O driver 160, described above in connection with FIG. 1. The engine 145 further includes a memory 260 and one or more processors 210 in communication with the memory 260.

Memory 260 stores information accessible by processor 210, including instructions 264 that may be executed by the processor 210. The memory also includes data 262 that may be retrieved, manipulated or stored by the processor. The memory may be of any type capable of storing information accessible by the processor, such as a hard-drive, memory card, ROM, RAM, DVD, CD-ROM, write-capable, and read-only memories. The memory 260 includes data 262 that may be retrieved, manipulated or stored by the processor in accordance with the instructions 264. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 264 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The one or more processors 210 may be a commercially available multi-core processor including a plurality of processing units. According to other examples, the one or more processors 210 may be one or a collection of specialized or commercially available individual processing units, such as application specific integrated circuits (ASICs), microprocessors, state machines, etc. While the plurality of processing cores are shown as being within the same box of the engine 145, it should be understood that the cores may be individual processing units residing on separate devices. For example, the cores may reside in a NIC, in an accelerator device, independently, etc.

Each core 270, 280, 290 has an assigned thread 275, 285, 295. Each thread 275, 285, 295 carries out the following actions in a busy-processing loop, though not necessarily in the order specified: process incoming packets, run reliable transport for received packets, process Verb operations, run reliable transport for transmission packets, poll command queues for each application. Thus, a thread that is performing a function such as processing incoming packets may also process a Verb operation, without making up another thread.

The operations processed by the threads 275, 285, 295 may be any logical actions that interact with remote resources. The operations may be initiated by commands, though not all commands initiate operations. For example, some commands may modify a local state. While operations begin with a command expressing an intent of an application user, the operations may encompass a wide range of resources, including local and remote state tracking objects, memory, wire messages, communication channels carrying messages, and ultimately one or more completions generated by local and remote engines. Some example operations includes remote memory access (RMA) reads and writes, atomics operations such as compare-and-swap (CAS) and fetch-and-add, or send and receive operations.

According to one example, dynamic load information may be used to dynamically increase or decrease a number of processing units dedicated to packet processing. For example, a first number of cores may be running processes, while the engine 145 monitors a load on the first number of cores. The system may use signals such as queue length, queuing delay, and fraction of busy processing loops to detect overload load conditions. If the engine 145 detects that the load approaches or exceeds a threshold, it may allocate another core to share the load. In allocating the other core, another engine may be spawned, and some of the load of the first number of cores may be migrated onto the other core. Conversely, if the engine detects that a load on one or more of the first number of cores is below a different threshold, it may be determined that more cores are allocated for packet processing than needed. Accordingly, one or more of the first number of cores may be de-allocated, and its load may be migrated onto one of the remaining cores or shared among multiple ones of the remaining cores. In this regard, cores are dynamically dedicated over coarser time scales than in existing stacks that use interrupts. Further, when a resource is dedicated to packet processing, no other tasks can be scheduled on it. Rather, the core is exclusively allocated for a known time period going forward.

Although FIG. 2 functionally illustrates the processor 210 and memory 260 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 210. Similarly, the processor 210 may actually comprise a collection of processors which may or may not operate in parallel.

Moreover, although FIG. 2 shows the engine 145 as an individual block containing its own processors and memory, the operations described herein may involve many computing devices, e.g., in the "cloud". For example, various operations described below as involving a single computing device may involve a plurality of computing devices, such as multiple processors in a load-balanced server farm. Similarly, memory components at different locations may store different portions of instructions 264 and collectively form a medium for storing the instructions. Various operations described herein as being performed by a computing device may be performed by a virtual machine. By way of example, instructions 264 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Figure 3:
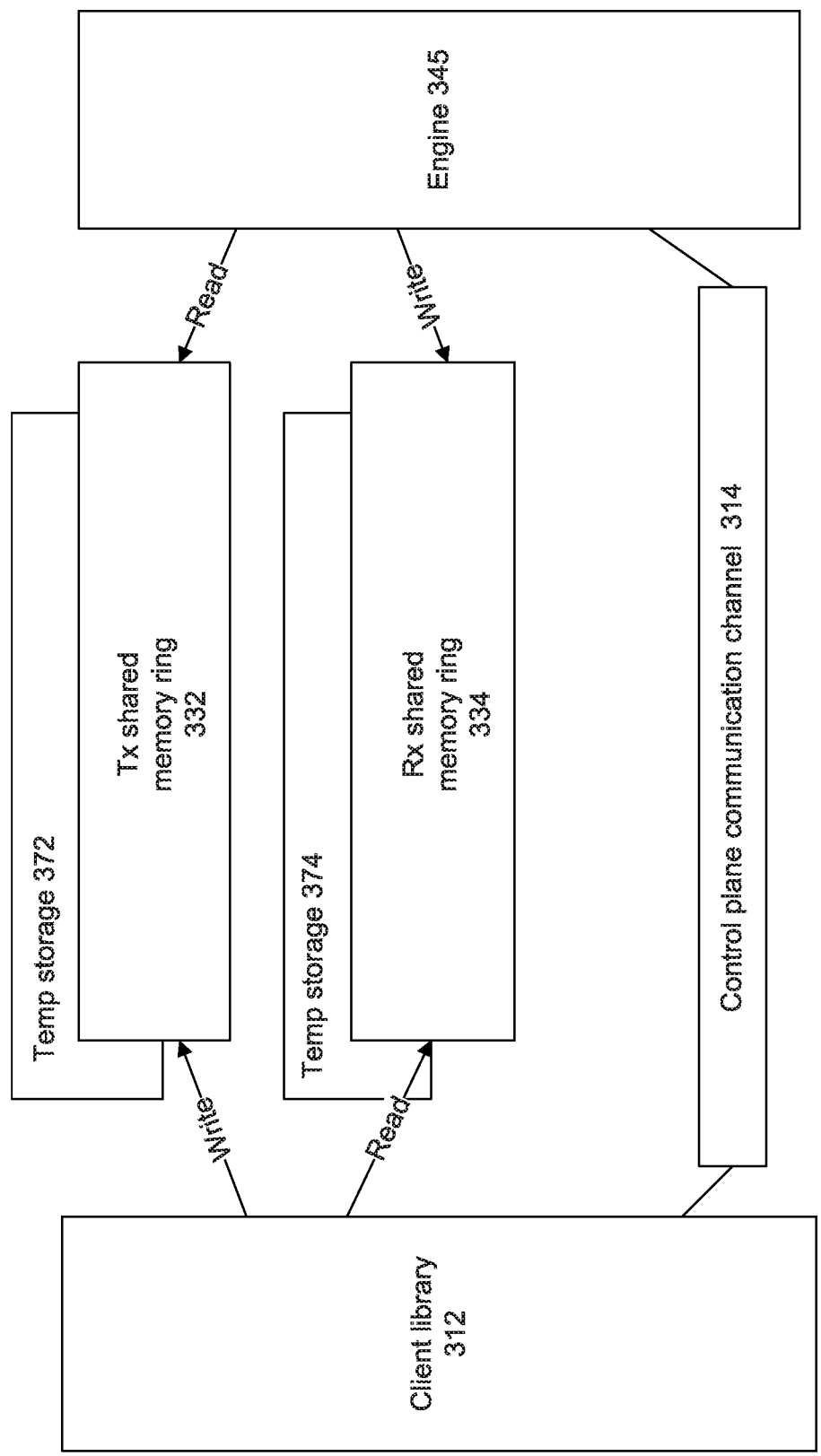
FIG. 3 is a schematic diagram illustrating communication using shared memory according to aspects of the disclosure.

FIG. 3 illustrates in further detail an example of the shared memory between client library 312 and engine 345. The shared memory includes one or more shared memory rings. For example, as shown the shared memory includes a Tx shared memory ring 332 and a Rx shared memory ring 334. According to some examples, where a plurality of client libraries communicate with the engine 345, a separate pair of shared memory rings may be used by each client library in the plurality.

The client library 312 initially establishes communication with the engine 345 via a control plane communication channel (CPCC) 314. The CPCC 314 may use operating system services provided by an operating system. For example, the CPCC 314 may be an RPC system. The CPCC 314 may be based on a Unix Domain socket or other inter-process communication (IPC) system, which provides the ability to pass file descriptors through the socket. Accordingly, memory may be shared between processes, for example, by passing a /tmpfs file descriptor. Once communication between the client library 312 and the engine 345 is established via the CPCC 314, the CPCC 314 may be used to establish the shared memory rings 332, 334. The CPCC 314 may be considered a slow path while the shared memory rings 332, 334 are considered a fast path.

The Tx shared memory ring 332 and Rx shared memory ring 334 may be shared memory rings. The Tx shared memory ring 332 and Rx shared memory ring 334 may be backed by temporary file storage memory. For example, the Tx shared memory ring 332 may be backed by temporary file storage 372, while Rx shared memory ring 334 is backed by temporary file storage 374. In other examples, one backup storage unit may support both the Tx shared memory ring 332 and the Rx shared memory ring 334.

Datapath operations occur over the shared memory rings 332, 334. The shared memory rings 332, 334 provide memory-based command and completion queues. For example, the Tx shared memory ring 332 may serve as a command queue, and the Rx shared memory ring 334 may serve as a completion queue. The Tx shared memory ring 332 may support only a single producer thread. The Rx shared memory ring 334 may support only a single consumer thread. The shared memory rings provide a lock-free mechanism for clients to interact with the engine 345. No synchronization is required between Tx shared memory ring 332 and the Rx shared memory ring 334.

According to one example, the client library 312 attempts to connect to a well-known name in a global namespace across all containers on a machine. As part of a CPCC 314 handshake, a client API version number is exchanged. The engine 345 implements the API version number of any applications in use.

Variable length messages may be pushed through and pulled from the shared memory rings. For example, as shown in FIG. 3, the client writes commands to the Tx shared memory ring 332, which are read by the engine 345. When the engine 345, in coordination with the NIC, performs operations initiated by the commands, it writes completions to the completion queue in the Rx shared memory ring 334.

In some instances, backpressure may be exerted to the client application when the command queue becomes full. For example, the engine 345 may be busy, in which case the client is blocked from pushing more work. If the client application stops pulling completions from the engine 345, the engine 345 will stop pulling more commands from the command queue until space is available in the completion queue.

Figure 4:
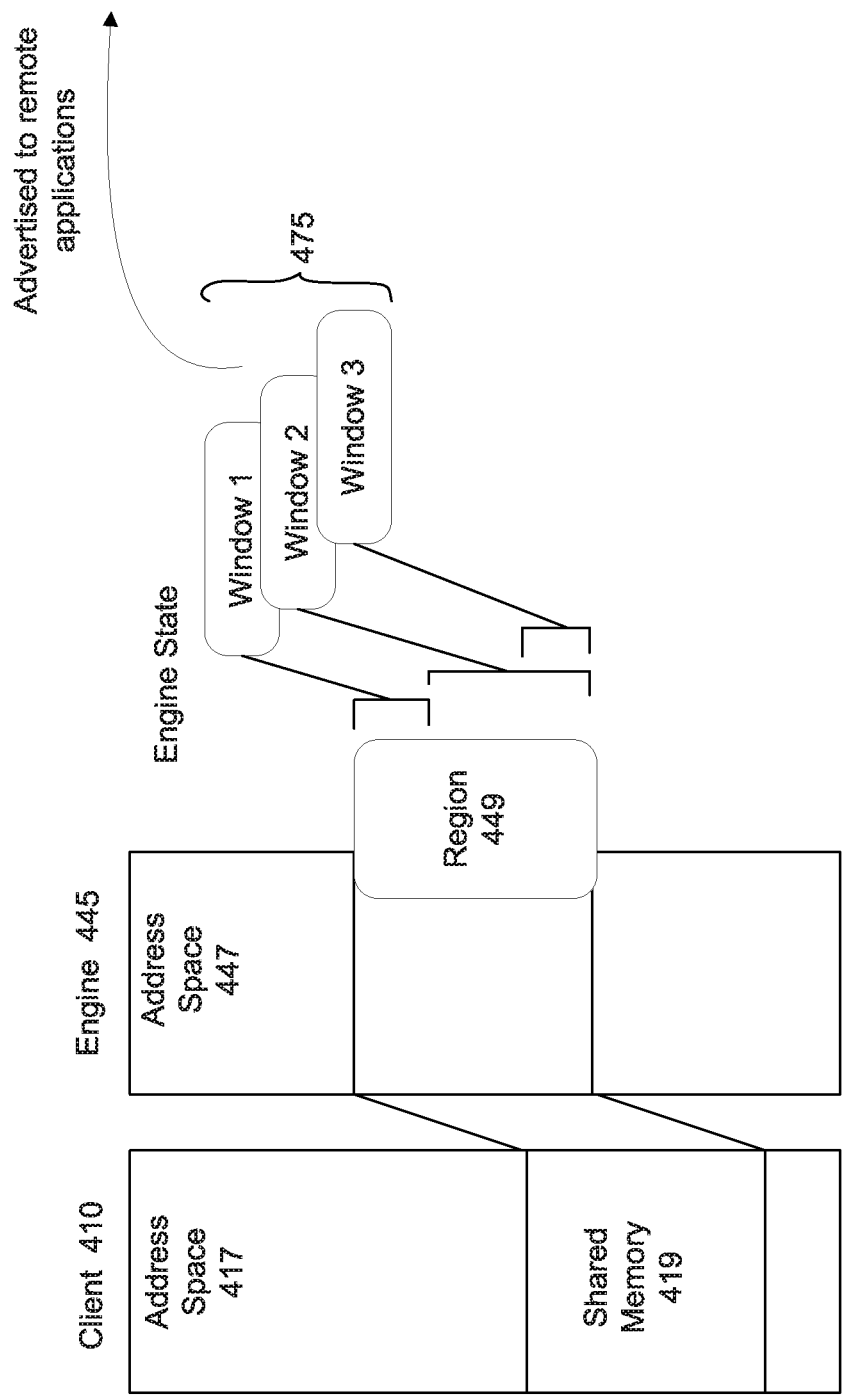
FIG. 4 is a functional diagram illustrating accessing memory according to aspects of the disclosure.

FIG. 4 illustrates an example of how client applications describe local memory to the engine that is running in different process. Regions, such as a region 449, may be used to identify memory in an address space 447 of engine 445.

The engine 445 tracks local memory via region objects, which may be a base pointer and length. In some examples, applications can create regions by allocating shared memory 419 in a client process, and then remapping that memory in the engine process. In other examples, applications can register existing memory with the engine 445. Once the client 410 has set up one or more regions 449, describing local memory of the engine 445 may require a region handle and an {offset, length} within that region 449. Virtual addresses may be ignored across process boundaries.

According to one example, client 410 pushes a command to engine 445, and the command initiates operations such as RMA reads or writes, atomic operations, or send and receive operations. The command may specify the region 449 of memory. For example, RMA reads and writes specify both a remote region of memory in an address space 417 of the client 410, and a local region 449 of memory in the address space 447 of the engine 445. To allow a remote application to access the region 449, one or more windows 475 may be attached to the memory region 449, explicitly granting remote access to that memory. Windows 475 can also be used to manage fine-grained access control. If an application wants a remote application to be able to read some of its local memory, it will create a window tied to a previously created region, and then announce that window handle to the remote application. When submitting a Read command, the remote application will specify a local region, and the previously announced window, and vice versa for a Write command.

According to another example, "Sends" allow an application to send unsolicited data from local memory to a buffer provided by the remote application. The region 449 is used to describe the local memory, but no description of remote memory is needed. In some examples, a buffer pool may manage local receive memory, allowing arbitrary incoming Sends to share the same pool of buffers.

A bidirectional sequence of operations may be exchanged between two clients. This sequence of operations may be referred to as a stream. When submitting any of the commands discussed above to the engine 445, the application also specifies a stream that the command should be executed on. The engine 445 may create internal operations to track the progress of each command, and enqueue those operations on their specified stream. Completions on streams are delivered in command-submission order. The effects of the operations, however, may not occur in order, especially for multipath communications. For example, the effect of subsequent Writes may occur in any order, including interleaved. The stream can be canceled at any time, terminating any work on that stream with error completions delivered for all pending work.

Each window 475 and stream may be assigned an identifier, such as a color. Windows 475 may only be accessed by streams with identical color. Colors are stored and validated locally, which may prevent spoofing. A remote engine 445 may only access windows 475 through a stream of matching color. Streams must be created cooperatively by both the client application 410 and the engine 445, and thus all access to memory windows should be explicitly granted.

Figure 5:
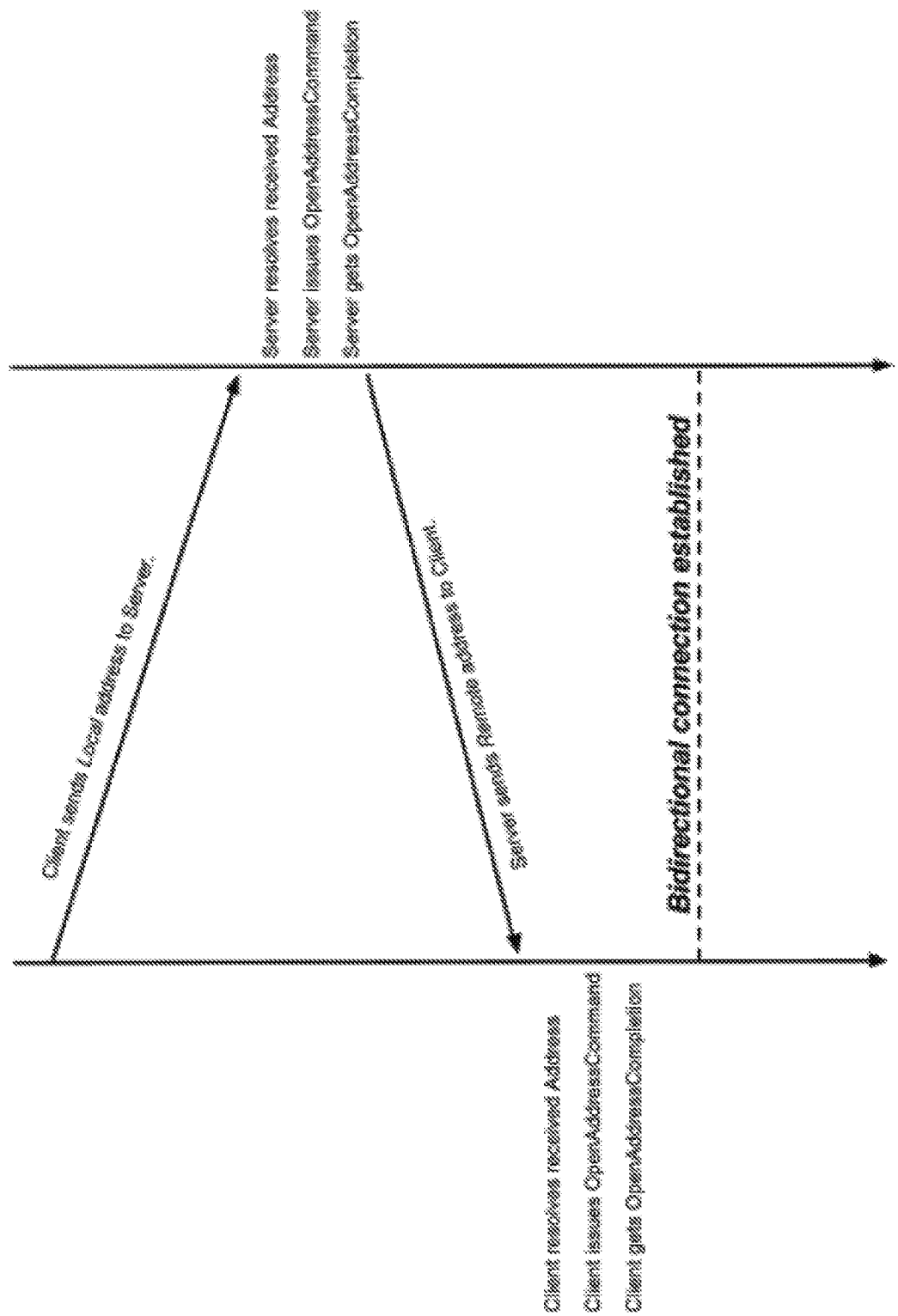
FIG. 5 is a schematic diagram illustrating communication between two example systems according to aspects of the disclosure.

FIG. 5 illustrates an example of communication between two engines. Applications may begin a connection establishment process via HTTP to the application's HTTP server. A local engine exports to its clients an address. The address may be a protocol buffer that tells a remote engine how to connect to the local engine. The addresses may be exchanged to connect the local engine to the remote engine. For example, as shown in FIG. 5, a client sends an address of the local engine to the server, e.g., the HTTP server. The server resolves the received address, and obtains an address for the remote engine. The server sends the remote engine address to the client, which resolves the remote engine address. Accordingly, a bidirectional connection is established between the local engine and the remote engine.

A reliable unordered datagram transport between two engines may be referred to as a network flow. Streams multiplex onto a network flow. A congestion window is associated with a network flow. A many-to-many map between network flows and streams may be referred to as a flow mapper. The flow mapper is responsible for scheduling streams onto network flows. Each flow mapper corresponds to a remote engine. As such, each stream, via its address, corresponds to a flow mapper. Each flow mapper has one or more network flows to that remote engine. When a network flow has an opportunity to send a packet, it asks the flow mapper, which in turn chooses streams to fill the packet. Small messages from multiple streams are multiplexed onto the same flow and can be batched into a single packet. Multiple streams can be multiplexed onto each flow, including at the sub-packet level, including streams from different clients.

Figure 6:
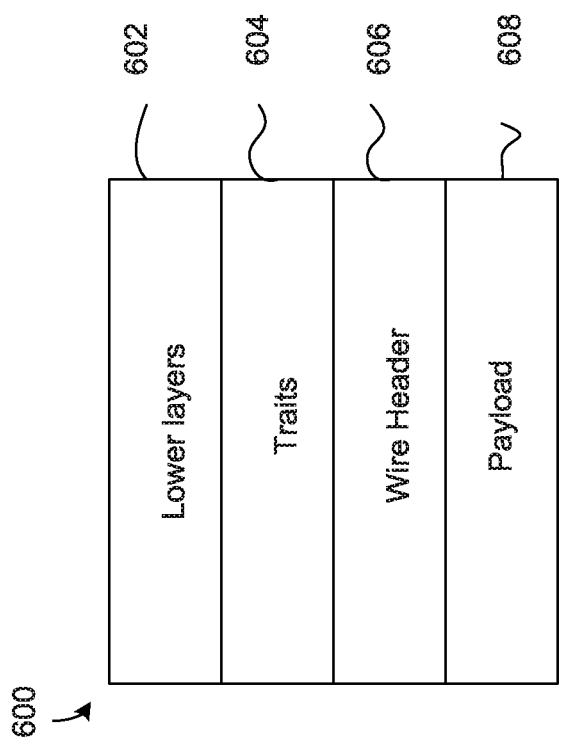
FIG. 6 illustrates an example packet according to aspects of the disclosure.

FIG. 6 illustrates an example packet 600 used for a parametric and reliable transport protocol. The packet 600 includes lower layers 602, such as headers, traits 604, Wire Header 606, and a payload 608.

The transport protocol is one implementation of a network flow, and provides reliable ordered delivery of arbitrary datagrams. The parametric portion of the transport protocol is referred to as "Traits" in FIG. 6. A specific collection of trait instances defines a concrete wire format. For example, one concrete trait may be congestion control, timing information, etc. The wire format may contain an operation code for specifying which Verb operation to be performed. The packet may be modified based on the traits. For example, while the Wire Header 606 and payload 608 may remain the same, other headers in the packet may be modified depending on the traits. IPv4 traits provide an Ethernet/UDP/IPv4 header. The transport protocol may include an acknowledgement (ACK) in every packet, acknowledging all packets up to a sequence number. When no work is available, it can generate "Nop" packets that contain only an ACK. If it detects a drop, it generates an explicit NACK. The transport protocol further supports path migration. If it detects that a current path is suitably congested, it can change a source user datagram protocol (UDP) port in hopes of moving a flow to a less congested path.

Example Methods

Figure 7:
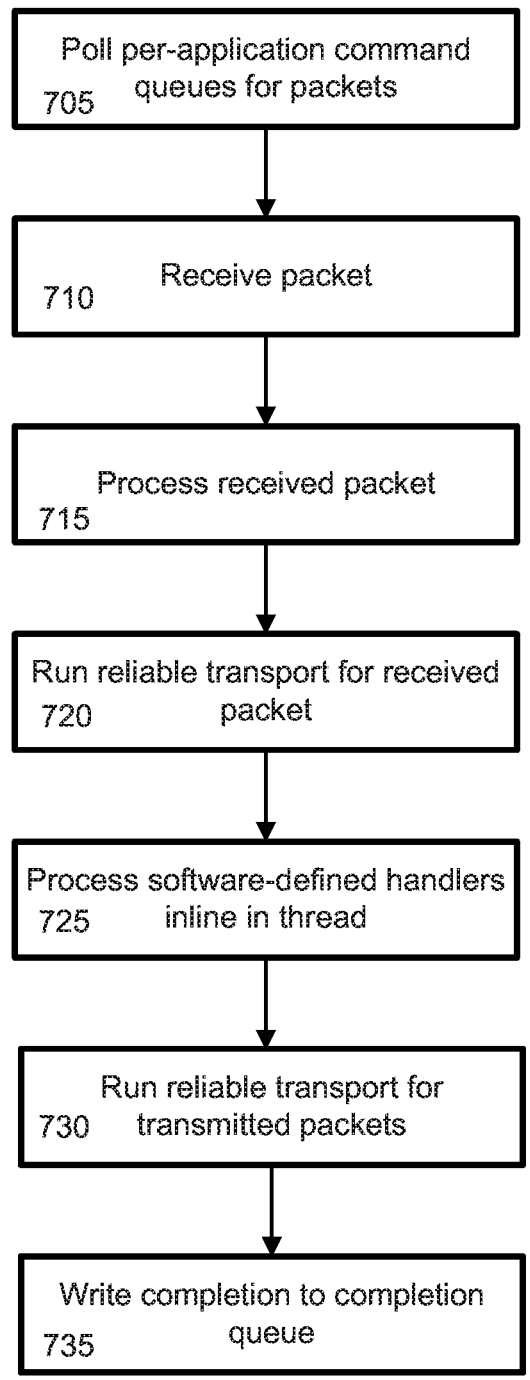
FIG. 7 is a flow diagram of an example method according to aspects of the disclosure.

FIG. 7 provides an example flow diagram illustrating a method 700 for processing transactions using a dedicated core for packet processing. The method 700 may be performed by, for example, a system including a NIC having multiple processing cores interfaced with a packet processing pipeline, referred to as an engine. The engine may further include one or more processors programmed to perform the packet processing. It should be understood that the operations involved in the below methods need not be performed in the precise order described. Rather, various operations may be handled in a different order or simultaneously, and operations may be added or omitted.

In block 705, the system polls command queues for packets. Each command queue may be specific to an application run on a separate dedicated processing unit. The command queues may be included, for example, in a shared memory between the NIC/engine and the separate dedicated processing unit for the application.

In block 710, the system receives a packet from the application processing unit. For example, the system pulls the packet from the command queue.

In block 715, the system processes the received packet. For example, the engine captures what is included in the packet and interprets it.

In block 720, the system runs reliable transport for the received packet. For example, the received packet may have a format as described above in connection with FIG. 6. An acknowledgement may be included in the packet. Accordingly, the system confirms whether or not the packet was received. If the packet was not received, a negative acknowledgement may be sent, so that the packet can be resent or that receiving the packet can otherwise be re-attempted.

In block 725, a software-defined handler is processed inline with a same thread in which the packet was received and processed. For example, the received packet may include an operation code specifying a Verb to be performed. Rather than waking up a new thread to perform the Verb, it is performed in the same thread.

In block 730, the system runs reliable transport for transmitted packets. For example, the system transports the processed packet back to the application processing unit or to other devices in the network.

In block 735, the system write completions to a completion queue. The completion queue may be included in the shared memory between the application processor and the engine/NIC. For example, the completion queue may be accessed by the application processor to determine which tasks have been completed. The application processor may further update the command queue and the completion queue in response to reading completions. For example, when the application processor reads that a completion has been entered, the application processor may clear the completion from the completion queue and the corresponding command from the command queue.

Each of the above tasks may be performed in the same processing thread. For example, as opposed to waking up a new thread to perform a particular operation, such operation may be performed in the same thread as the others.

Because the system and methods described above emulate a "Smart" NIC using general purpose computing devices, these systems and methods provide significant cost savings. For example, rather than replacing vast quantities of hardware, existing hardware can be updated. Moreover, by having dedicated processing cores for packet processing, resources should always be available for incoming commands In some examples, additional processing cores may be tasked under significant loads. For example, if the command queue becomes filled, additional processors may be assigned threads to perform processes such as those described in connection with FIG. 7.

Figure 8:
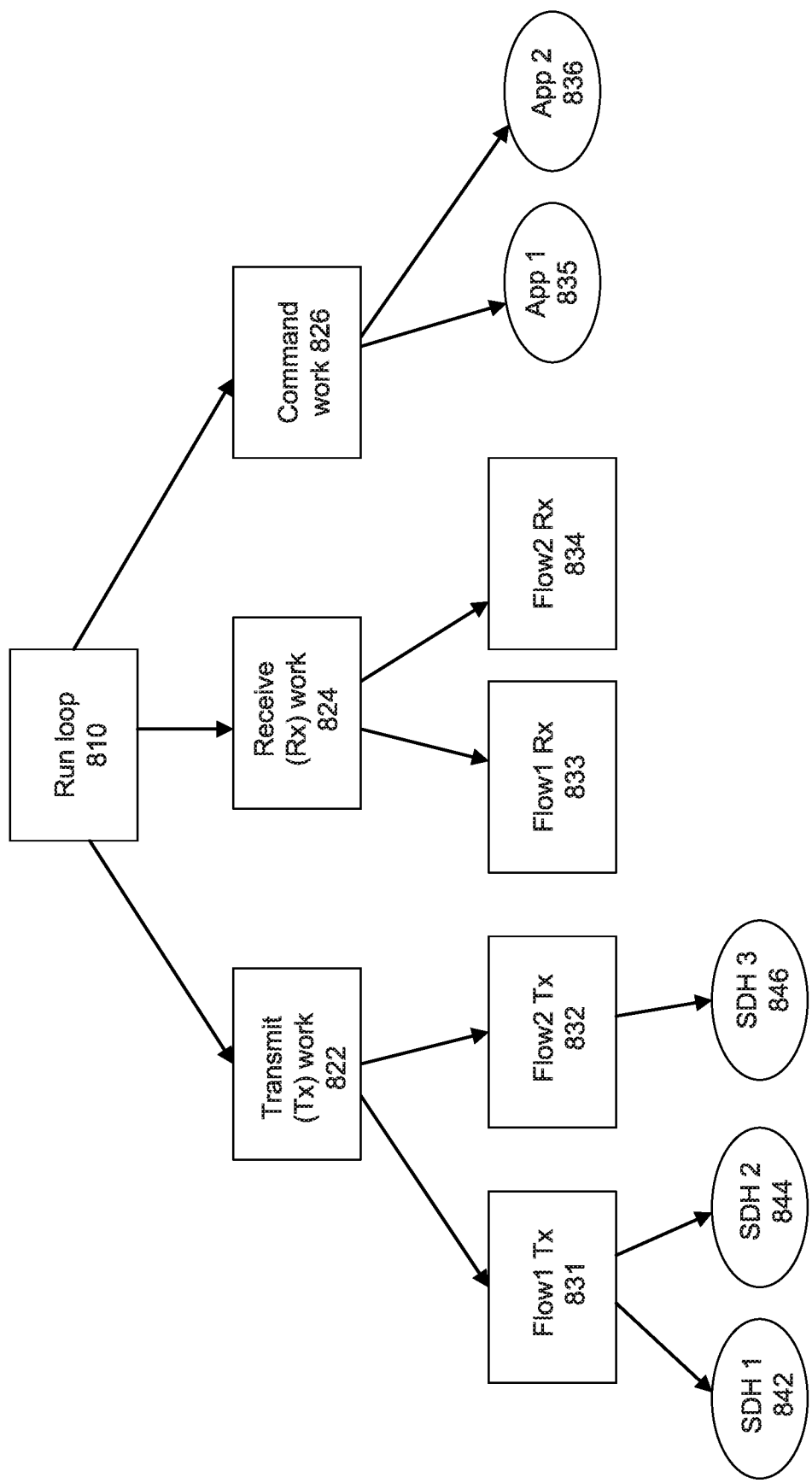
FIG. 8 illustrates a processing loop apportioning processing time among activities according to aspects of the disclosure.

FIG. 8 illustrates a processing loop apportioning processing time among activities. A Run loop 810 divides processor time among transmit (Tx) work 822, receive (Rx) work 824, and command work 826. Tx work 822 is performed by a first Tx flow 831 and a second Tx flow 832, though it should be understood that additional or fewer flows may be utilized in other examples. The first Tx flow 831 services software defined handlers 842, 844, while the second Tx flow 832 services software defined handler 846. The Rx work 824 is performed by a first Rx flow 833 and a second Rx flow 834, though it should be understood that additional flows may be utilized in other examples. The command work is generated by applications 835, 836. According to one example, the software defined handlers 842, 846 do work for client application 835, while the software defined handler 844 does work for client application 836. In this regard, the Tx work 822 is generally fair relative to the software defined handlers 842-846. In some examples, the Rx work 824 provides fairness according to network usage and thus relies on congestion control and other feedback mechanisms for fairness. The command work 826 is client fair. For example, if multiple clients are providing approximately equal amounts of work, each of the multiple clients will receive approximately the same percentage of resources.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A system, comprising:
a memory storing packet processing instructions; and
one or more dedicated packet processing units in communication with the memory and with one or more application processing units, the one or more dedicated packet processing units dedicated to performing packet processing and further configured to be updated to process new software-defined handler operations, each of the one or more dedicated packet processing units having an assigned processing thread, wherein the one or more dedicated packet processing units are configured to:
receive, in a first processing thread, a packet from an application running on the one or more application processing units;
process, in the first processing thread, software-defined handler operations initiated by commands in the received packet without dispatching the software-defined handler operations to an application thread, wherein the software-defined handler operations include interacting with a remote resource.

2. The system of claim 1, wherein the one or more dedicated packet processing units are further configured to:
run transport for the received packets; and
run transport for processed packets to be transmitted;
wherein running the transports are performed in the first processing thread.

3. The system of claim 2, wherein the transport interfaces with the one or more application processing units without context switching or system calls.

4. The system of claim 2, wherein in running transport for the received packets the one or more dedicated packet processing units are configured to:
detect network trouble,
modify transport parameters in response to detecting network trouble, and
note any packets lost in transmission.

5. The system of claim 1, wherein the one or more dedicated packet processing units are further configured to:
poll one or more command queues, each command queue being specific to an application, wherein the received packet is pulled from the one or more command queues; and
enter completions into one or more completion queues.

6. The system of claim 5, wherein the one or more command queues and the one or more completion queues are included in a shared memory, the shared memory being shared between the one or more dedicated packet processing units and a second processing unit specific to the application.

7. The system of claim 1, wherein the one or more dedicated packet processing units are processing cores of a multi-core processor.

8. The system of claim 1, wherein the one or more dedicated packet processing units are further configured to dynamically increase or decrease a number of the one or more dedicated packet processing units.

9. The system of claim 1, wherein the first set of processing units are configured to:
poll at least one command queues for each application; and
enters completions in at least one completion queues after completing packet processing operations.

10. The system of claim 1, wherein the software-defined handler operations are Verb operations interacting with the remote resource.

11. A system, comprising:
one or more memories;
a first set of processing units in communication with the one or more memories, the first set of processing units configured to exclusively perform packet processing and further configured to be updated to process new software-defined handler operations, the processing includes processing software-defined handler operations initiated by commands in a received packet without dispatching the software-defined handler operations to an application thread, wherein the software-defined handler operations include interacting with a remote resource;
a second set of processing units in communication with the one or more memories and the first set of processing units, the second set of processing units configured to exclusively run applications.

12. The system of claim 11,
wherein each of the first set of processing units is assigned a processing thread, the processing thread executable by one of the first set of processing units to:
process the received packets;
run transport for the received packets;
process the software-defined handler operations; and
run transport for packets to be transmitted.

13. The system of claim 11, further comprising a shared memory between the first set of processing units and the second set of processing units.

14. The system of claim 13, wherein the shared memory comprises shared memory rings.

15. The system of claim 14, wherein each of the second set of processing units communicates over a separate set of shared memory rings, the set comprising transmit rings and receive rings.

16. A method, comprising:
receiving, with a first processor dedicated to performing packet processing and executing a first processing thread, a packet from an application run on a second processor dedicated to application processing;
processing, in the first processing thread, software-defined handler operations initiated by commands in the received packet, without invoking additional threads, wherein the software-defined handler operations include interacting with a remote resource;
receiving, by the first processor, definitions of new software-defined handler operations; and
processing, by the first processor, the new software-defined handler operations.

17. The method of claim 16, further comprising:
running transport, with the first processor executing the first processing thread, for the received packet; and
running transport, with the first processor executing the first processing thread, for processed packets to be transmitted.

18. The method of claim 17, wherein running transport for the received packets comprises:
detecting network trouble,
modifying transport parameters in response to detecting network trouble, and
retransmitting any packets lost in transmission.

19. The method of claim 16, wherein receiving the packet comprises:
polling, with the first processor executing the first processing thread, one or more command queues in a shared memory between the first processor and the second processor, each command queue being specific to an application run on the second processor; and
pulling the packet from the one or more command queues.

20. The method of claim 19, further comprising entering completions into a completion queue in the shared memory.

* * * * *